UNITED STATES PATENT OFFICE.

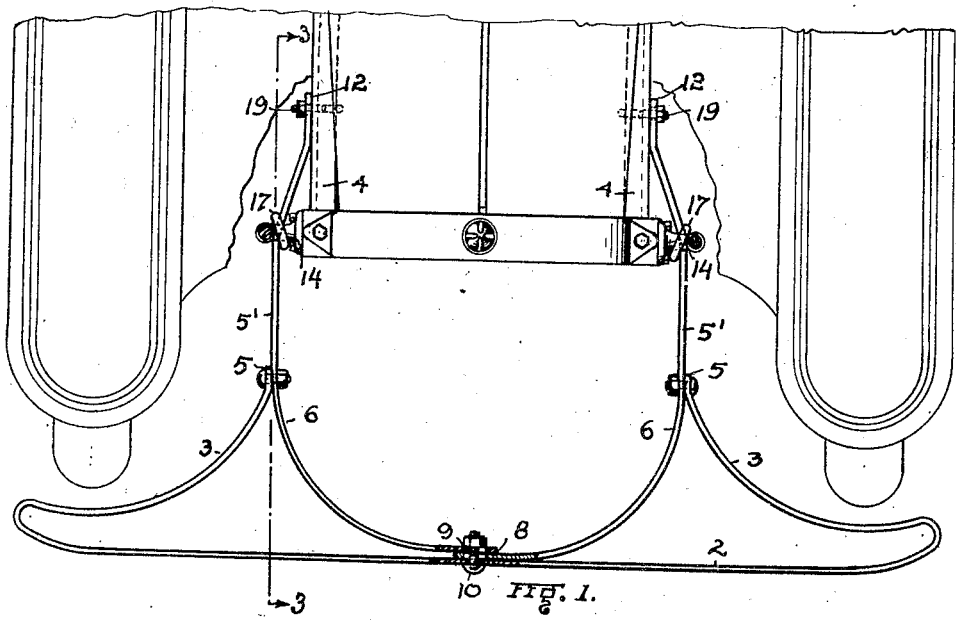
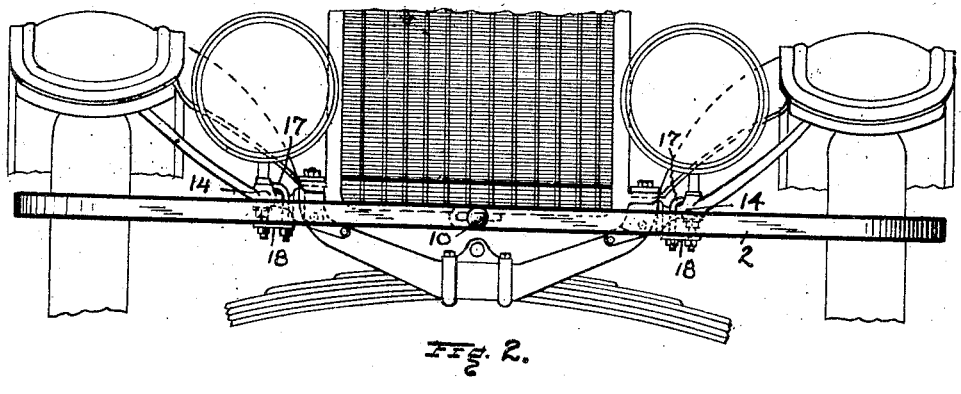
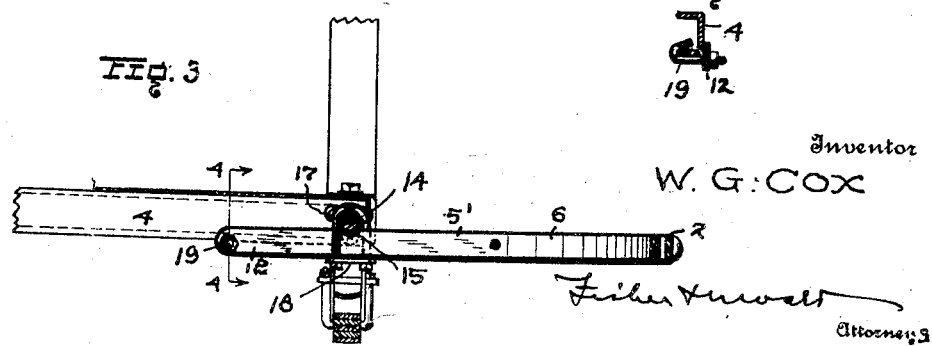

WILLIAM G. COX, OF CLEVELAND, OHIO, ASSIGNOR TO COX BRASS MANUFACTURING COMPANY, OF ALBANY, NEW YORK, A CORPORATION OF NEW YORK.

SPRING-BUMPER FOR AUTOMOBILES.

1,398,177.     Specification of Letters Patent.     Patented Nov. 22, 1921.

Application filed September 28, 1921. Serial No. 503,860.

*To all whom it may concern:*

Be it known that I, WILLIAM G. COX, a citizen of the United States, residing at Cleveland, in the county of Cuyahoga and State of Ohio, have invented certain new and useful Improvements in Spring-Bumpers for Automobiles, of which the following is a specification.

This invention relates to spring bumpers or buffers for automobiles, and as constructed and organized the bumper is adapted to be readily assembled and attached to the fender irons and frame of certain types of automobiles, and also adapted to cushion and absorb shocks and impacts without breakage of the fender or injury to the vehicle.

In the accompanying drawing, Figure 1 is a plan view of my improved bumper mounted upon the front end of an automobile, and Fig. 2 is a front view of the same parts, Fig. 3 is a side view and vertical section on line 3—3 of Fig. 1. Fig. 4 is a cross section on line 4—4 of Fig. 3, of a portion of the channel frame of the vehicle, showing one bracket member of the bumper bolted thereto.

The bumper comprises a narrow and relatively long spring impact bar 2 which is doubled back at each end to provide separate spring arms 3—3 of sweeping curvature adapted to extend inwardly and rearwardly toward the channeled side members 4 of the vehicle frame so that the perforated extremities 5 of arms 3 may be bolted directly to the straight middle portions 5' of a pair of supporting bars or brackets 6 of spring metal having curved front portions 7 adapted to overlap and bear against each other at the rear side and middle of the front bar 2. The overlapping ends 8 of supporting bars 6 have parallel slots 9 adapted to register with a bolt opening in front bar 2, and a bolt 10 unites the three bars together at this meeting point. A shock or blow centrally on the bumper flexes all three bars of the bumper inwardly and under severe shocks the slots permit the rear bars to move within limits in respect to each other and the bolt, thus preventing a break at the union. The slots also permit the supporting bars or brackets 6 to spring or be spread apart or brought nearer to each other at their inner ends 12 where engaged with frame members 4, thus adapting the bars to be readily fitted and attached to the vehicle frame. Ends 12 are bolted to members 4 and also bent or offset on angular lines to permit bars 6 to rest upon the fender irons or lamp brackets 14, and a notch 15 is provided in the bottom edge of each bar 6 to receive the fender irons. A U-bolt or shackle member 17 is suspended from each fender iron 14 and bars 6 pass between the legs of this member and rest upon the clamping strap 18 forming part thereof, see Fig. 3, thus firmly holding the bumper in a horizontal position at the front of the vehicle. The offset rear ends 12 of bars 6 are secured to the channels 4 by bolts 19 of any suitable kind or form.

What I claim is:

1. A spring bumper for automobiles, comprising an impact bar having reversely-bent ends extending rearwardly toward each other on curved lines, and a pair of supporting bars having curved overlapping front portions provided with slots adapted to be bolted to said impact bar and offset rear ends adapted to be bolted to the frame of the automobile, and a single bolt extending through said slots uniting said front bar and supporting bars together.

2. A spring bumper for automobiles, comprising an impact bar having reversely-bent spring extremities curved inwardly and rearwardly, a pair of separate supporting bars having curved front portions bolted to said front bar at its middle and to said curved extremities, each supporting bar having an offset end and a notch in one edge adapted to fix the position of the bumper upon the frame of the automobile, and means to fasten said bars rigidly at its ends and at said notches to the frame.

3. A spring bumper for automobiles, comprising a front bar having reversely-bent end portions curved toward each other and rearwardly, separate supporting arms having slotted curved front portions adapted to overlap and engage the middle of said front bar and being offset at their rear ends, means uniting the slotted portions of said supporting bars with the front bar with a limited play therebetween, and means adapted to secure the rear offset ends of said supporting bars to the frame of the automobile.

In testimony whereof I affix my signature.

WILLIAM G. COX.